United States Patent [19]

Oishi

[11] Patent Number: 4,754,358
[45] Date of Patent: Jun. 28, 1988

[54] MAGNETIC TAPE CASSETTE HUB WITH FLUSH TAPE CLAMP

[75] Inventor: Kengo Oishi, Kanagawa, Japan

[73] Assignee: Fuji Photo Film Co., Ltd., Kanagawa, Japan

[21] Appl. No.: 933,954

[22] Filed: Nov. 24, 1986

[30] Foreign Application Priority Data

Nov. 25, 1985 [JP] Japan .......................... 60-179831[U]

[51] Int. Cl.$^4$ ...................... G11B 15/32; G11B 23/08
[52] U.S. Cl. ..................................... 360/132; 242/199
[58] Field of Search ................. 360/132; 242/197-200

[56] References Cited

U.S. PATENT DOCUMENTS 3,666,203  5/1972  Sato et al. ...................... 360/132 X
3,686,470  8/1972  Stahlberg et al. ................... 360/132
3,848,265  11/1974  Biery et al. .......................... 360/132

FOREIGN PATENT DOCUMENTS 1234816  6/1971  United Kingdom ................ 360/132

Primary Examiner—John H. Wolff
Attorney, Agent, or Firm—Sughrue, Mion, Zinn, Macpeak, and Seas

[57] ABSTRACT

A hub for a tape cassette comprising a cylindrical core with a surrounding girdle and a clamp for clamping the tape into a cutout in the girdle. The clamp has the same curvature as the girdle. Two legs of the clamp fit into axial grooves in the core. The legs are axially clamped by opposing ends of the two grooves and are radially clamped by overhangs of the girdle.

1 Claim, 1 Drawing Sheet

MAGNETIC TAPE CASSETTE HUB WITH FLUSH TAPE CLAMP

BACKGROUND OF THE INVENTION

1. Field of the Invention

The present invention relates to a magnetic tape cassette. More particularly, the present invention relates to a novel compact cassette suitable for use with audio tape whose size is equal to or larger than the Phillips type.

2. Background of the Invention

With the recent tendency toward smaller and lighter cassette tape recorders, the use of smaller magnetic tape cassettes has expanded in video recording applications. In the area of audio recording, too, it is strongly desired to develop magnetic tape cassettes that are adaptive to high-quality and high-density recording and reproduction over long playing times. In response to this need, digital rather than analog tape cassettes have been proposed which depend on the principles of pulse-code modulation (PCM). In PCM, an input signal is converted to a train of pulses for recording and reproduction purposes. According to this system, the range of recording frequencies must be about 5 times as wide as in the case of the conventional audio tape and it is common practice today to use large-size video tape cassettes that are capable of recording over a broader frequency range than audio compact cassettes.

Except in special cases, the video cassettes of the type described above are designed to allow recording with a rotary head. The basic feature common to these cassettes is that the opening in the front portion is closed while there is provided a guard panel that is upwardly openable. In other words, in digital recording which uses shorter wavelengths than the conventional audio compact cassette and which is intended to perfrom high-density recording and reproduction over a wide frequency band, the cassette must be so constructed that is achieves sufficient tape protection to ensure high reliability.

The present invention aims at providing a magnetic tape cassette that is adaptive to audio recording and reproduction over a wide frequency band which is comparable to the range used for the video tape cassette described above. The size of this tape cassette is very small and is by no means larger than the conventional audio compact cassette.

Conventionally, a magnetic tape cassette of the type contemplated by the present invention has incorporated therein a magnetic tape that is wound around a flangeless hub to which is secured a leader tape that is continous to the end of the magnetic tape. The hub is composed of a hollow cylindrical core that has a girdle with a cutout portion formed around it and a clamp that engages the cutout to hold the leader tape in position. The clamp is elastic so that it will tightly engage with the cutout portion. The clamp is so shaped that it has a different curvature than the girdle and, when fitted into the hub, the clamp deflects in such a manner that its curvature comes into registry with the curvature of the girdle. In fact, however, the clamp is retained with the hub by being elastically fitted into the cutout portion in a very tight state, so that the curvature of the clamp fitted into the cutout seldom completely registers with the curvature of the girdle. As a result, the hub becomes cut-of-round or eccentric (not completely round) and the running property of the magnetic tape wound onto the hub is adversely affected, as manifested by erratic tape running.

If the clamp was molded to have a curature that is equal to that of the girdle with the other features of the cassette construction remaining the same, the clamp would not be tightly fitted into the cutout and would be offset as a result of sliding in the axial direction. In an extreme case, the clamp would become completely dislodged from the cutout, thereby failing to hold the leader tape in position.

SUMMARY OF THE INVENTION

An object, therefore, of the present invention is to eliminate the aforementioned problems.

In particular, an object of the present invention is to provide a magnetic tape cassette that employs a clamp and girdle having the same curvature and which yet allows the leader tape to be securely retained in the cutout portion in the girdle. As a result, the magnetic tape on the hub remains completely round and is capable of running at constant speed.

The magnetic tape cassette of the present invention has a pair of hubs incorporated within the space formed by an upper and a lower half case, with a magnetic tape wound around each hub. Each hub is composed of a hollow cylindrical core that has a girdle with a cutout portion formed around it. The hub also has a clamp that has the same curvature as that of the girdle and which is fitted into the cutout portion to be retained in both the radial and peripheral directions. The clamp has a leg on each side thereof in the peripheral direction. The core has two grooves formed in the axial direction into which the legs are fitted so as retain the clamp in the axial direction.

DETAILED DESCRIPTION OF THE PREFERRED EMBODIMENT

Figure 1:
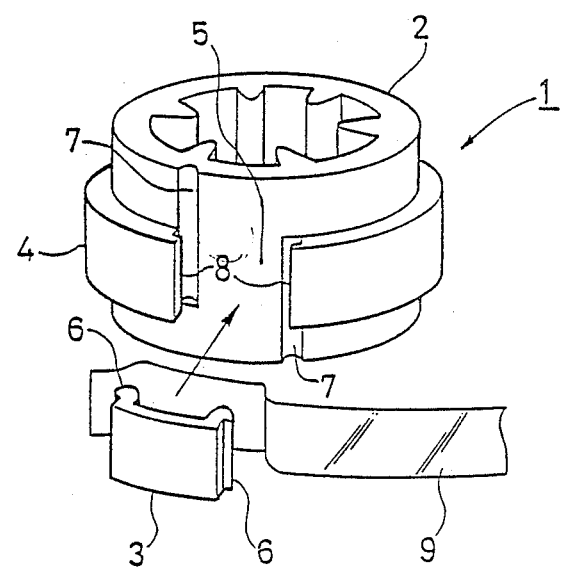
FIG. 1 is a perspective view of one of the two hubs incorporated in the magnetic tape cassette of the present invention.

In the tape cassette of the present invention, the clamp is fitted into a cutout portion in the girdle around the core member of each hub. Each of the legs is brought into engagement with a corresponding groove formed in the core. This clamp holds the end of the leader tape in proper position and will not move in any unwanted manner in either the peripheral or axial direction. Therefore, the clamp, which has the same curvature as the girdle, will in no case come out of engagement with the cutout portion and ensures complete roundness for the hub so that the magnetic tape is capable of running at constant speed.

One embodiment of the magnetic tape cassette of the present invention is hereunder described with reference to accompanying FIG. 1 which is a perspective view of a hub 1 in the cassette around which a magnetic tape is wound. The hub 1 is composed of a hollow cylindrical core 2 and a clamp 3. The core 2 has a girdle 4 that is molded as an integral portion of the core 2 and which provides a surface onto which the tape is to be wound. The girdle 4 has a cutout portion 5. The clamp 3 is molded to a shape that fits into the cutout 5 in the girdle 4 and has the same curvature as the girdle 4. As a result the clamp 3, when fitted onto the core 2, will provide a peripheral surface that is flush with the peripheral surface of the girdle 4 to form a perfectly cylindrical winding member. The clamp 3 is provided on each side in the circumferential direction with a leg 6 that projects both inwardly in the radial direction and outwardly at its foot in the circumferential direction. Axial grooves 7 into which the legs 6 are to be fitted are formed in those portions of the core 2 which correspond to the two opposing ends of the girdle 4 that define the cutout portion 5. The shape of the groove 7 conforms to the shape of the legs 6. The two opposite ends of the girdle 4 which define the cutout 5 are provided with overhanging stoppers 8 that serve to retain the legs 6 so that the clamp 3 will not become dislodged from the girdle 4.

In the embodiment shown, the two grooves 7 are formed in such a manner that one end of each groove 7 extends to an end face of the core 2 which is opposite the end face to which one end of the other groove 2 extends. In other words, the two grooves open to opposite ends of the core 2 in its axial direction and this arrangement serves to facilitate the demolding of the core after its shaping. It should, however, be noted that the grooves 7 will fulfill their function if they are long enough to permit the clamp legs 6 to be fitted thereinto. Therefore it is not necessary for the grooves 7 to extend up to the end faces of the core 2.

Magnetic tape to be would around the hub 1 has at its end a transparent or translucent leader tape 9 that is continuous with and is bonded to the magnetic tape. After fixing the end of the leader tape 9 to the hub 1, the magnetic tape is wound onto the girdle 4. The girdle 4 and clamp 3 are so formed that they are equal in width to the leader tape 9 and the magnetic tape. The end of the leader tape 9 may be fixed to the hub 1 as follows. The leader tape 9 is first put into registry with the cutout 5 in the circumferential direction and its end is placed into the cutout 5. Then, the clamp 3 is depressed in the radial direction so that it is fitted into the cutout 5. The legs 6 of the clamp 3 being depressed are deflected temporarily so as to faciliate its fitting into the cutout 5. This fitting requires some elasticity in the material of the clampt 5. However, once it is fitted into the cutout 5, it restores to its initial shape and will not be subject to any external force. Since the leader tape 9 is held between the legs 6 and the groove 7 evenly and reliably over the entire area in the axial direction, the magnetic tape can be wound around the hub without experiencing any deformation such as deflection. In addition, the clamp 3 is securely fitted into the cutout 5 and will not be dislodged therefrom. This secure fit is produced because, for one thing, the movement of the clamp in the radial direction is restricted by the stoppers 8 formed on opposite ends of the girdle 4 and, for another, its movement in the axial direction is limited by the closed end of each of the grooves 7.

Because of the high degree of roundness of the hub, magnetic tape can be wound onto the hub to provide a higher degree of roundness and this enables the tape to run at constant speed. Furthermore, the clamp by which the leader tape is fixed will not become dislodged from the hub core so that the magnetic tape can be wound onto the hub in a neat and compact form.

According to the present invention, the clamp is mounted on the core of each hub of a pair of hubs in order to fix magnetic tape to each hub. The legs of the clamp are retained in the radial direction by the stoppers formed on the girdle around the core and in the axial direction by the closed end of each of the grooves formed in the core. As a result, the clamp forms a nearly integral part of the core after having been fitted into the cutout portion and yet permits the leader tape to be held in proper position. The clamp is molded to have the same curvature as the girdle formed around the core but it will not be dislodged from the core at any time of tape winding. In addition, the engagement between the clamp and the girdle is not dependent on the deflection of the clamp. This fact is effective in preventing the clamp from reducing the degree of roundness of the surface of the hub around which the magnetic tape is to be wound. As a result, the running property of the magnetic tape is maintained sufficiently o provide constant tape running and to ensure accurate magnetic recording and reproduction. A particular advantage of the present invention will be found in its application to a magnetic tape cassette that is intended for high-density recording and reproduction.

What is claimed is:

1. In combination, a hub for fixing one end of a recording tape thereto for winding of said recording tape thereon, said hub comprising; a hollow cylindrical core, an integral, annular, radially projecting girdle, centered laterally on said hollow cylindrical core and having an axial width less than that of the core, a circumferential cutout within said girdle, extending to full thickness of said girdle, two axial grooves respectively within said hollow cylindrical core at the circumferential ends of said cutout, said girdle having a circumferential peripheral surface of given curvature, said girdle having two portions at said cutout overhanging each said groove, an elastic clamp having an outer surface with a curvature matching the circumferential peripheral surface curvature of said girdle, said clamp having legs, extending regularly at respective opposite circumferential ends of said clamp, sub-adjacent said outer surface, underlying said overhanging portions and configured to and fitting into said grooves, said grooves extending, repsectively axially inward from opposite axial ends of said core, across the full width of said girdle and terminating in enclosed ends adjacent opposite axial ends of said girdle, and wherein said clamp is resiliently deformed by pressing said two legs circumferentially towards each other to cause the legs to be fitted into said grooves with the clamp aligned circumferentially with said girdle, and the respective legs abutting the closed ends of said grooves to opposite sides of said clamp to prevent said clamp from shifting axially on said hub and to thereby maintain an end of said tape clamped between the clamp and the core to facilitate wrapping of the tape about the periphery of the hub girdle.

* * * * *